US010197788B2

(12) United States Patent
Hsu et al.

(10) Patent No.: US 10,197,788 B2
(45) Date of Patent: Feb. 5, 2019

(54) PROJECTOR

(71) Applicants: QISDA OPTRONICS (SUZHOU) CO., LTD., Suzhou, Jiangsu Province (CN); QISDA CORPORATION, Taoyuan (TW)

(72) Inventors: Li-Yen Hsu, Taoyuan (TW); Tsung-Hsun Wu, Taoyuan (TW); Ying-Fang Lin, Taoyuan (TW); Wen-Chung Ho, Taoyuan (TW); Chi-Hung Hsiao, Taoyuan (TW)

(73) Assignees: Qisda Optronics (Suzhou) Co., Ltd., Suzhou (CN); Qisda Corporation, Taoyuan (TW)

( * ) Notice: Subject to any disclaimer, the term of this patent is extended or adjusted under 35 U.S.C. 154(b) by 158 days.

(21) Appl. No.: 14/845,280

(22) Filed: Sep. 4, 2015

(65) Prior Publication Data

US 2016/0070095 A1 Mar. 10, 2016

(30) Foreign Application Priority Data

Sep. 4, 2014 (TW) .............................. 103130627 A

(51) Int. Cl.
*G02B 26/00* (2006.01)
*G02B 27/00* (2006.01)
(Continued)

(52) U.S. Cl.
CPC ....... *G02B 26/008* (2013.01); *G02B 27/0006* (2013.01); *G03B 21/145* (2013.01); *G03B 21/20* (2013.01); *G03B 33/08* (2013.01)

(58) Field of Classification Search
CPC .............. G02B 26/008; G02B 27/0006; H04N 9/3114; G03B 21/204; G03B 21/145; G03B 21/16
See application file for complete search history.

(56) References Cited

U.S. PATENT DOCUMENTS

| 2004/0145707 A1* | 7/2004 | Lee | .................. G03B 21/28 353/84 |
| 2008/0079909 A1* | 4/2008 | Lu | .................. G02B 26/008 353/84 |

(Continued)

FOREIGN PATENT DOCUMENTS

| CN | 101957174 A | 1/2011 |
| CN | 103257516 A | 8/2013 |

OTHER PUBLICATIONS

English Language Translation of CN 101957174 A, published Jan. 26, 2011.*

*Primary Examiner* — Christina Riddle
*Assistant Examiner* — Christopher Lamb, II

(57) ABSTRACT

A projector includes a color wheel module and an optical engine. The color wheel module includes a rotation device, a mount, a color wheel, and an optical sensor. The color wheel is fixed on a rotary part of the rotation device. The rotation device and the optical sensor are fixed on the mount. The mount has an anti-dust structure includes a curved surface that is opposite to a rotary surface of the rotary part and extends in a rotation direction of the rotary part. The curved surface and the optical sensor are arranged sequentially in the rotation direction. Either by shortening a distance between the curved surface and the rotary surface or by a guiding slot that is disposed beside or lower than the curved surface, dust deposited on the optical sensor can be reduced effectively.

17 Claims, 13 Drawing Sheets

(51) Int. Cl.
G03B 21/14 (2006.01)
G03B 21/20 (2006.01)
G03B 33/08 (2006.01)

(56) References Cited

U.S. PATENT DOCUMENTS

2013/0128237 A1* 5/2013 Huang ................... G03B 21/16
353/61
2015/0085260 A1* 3/2015 Hu ......................... G03B 21/16
353/61

* cited by examiner

PROJECTOR

BACKGROUND OF THE INVENTION

1. Field of the Invention

The invention relates to a projector, and especially relates to a projector using a color wheel and a color wheel module therefor.

2. Description of the Prior Art

For conventional projectors using a color wheel for splitting light, the color wheel of a color wheel module is driven by a motor. The rotation angular position of the color wheel is determined by using an optical sensor to detect a mark label attached on a rotation shaft of the motor. The motor is fixed usually by a fixing part made of a metal plate. The optical sensor is usually fixed on the fixing part. However, the optical sensor is separate from the motor, so a deposition of dust on the optical sensor is unavoidable. When the optical sensor is covered with the dust of a certain amount or thickness, the optical sensor probably fails. Some color wheel modules with a blocking structure are available in the field. The blocking structure is disposed close to the rotation shaft of the motor and adjacent to the optical sensor. An airflow induced by the rotation of the rotation shaft of the motor is mostly blocked by the blocking structure so that the probability of depositing dust on the optical sensor can be reduced. However, in practice, under a consideration to the mechanical movement of the rotation shaft of the motor (e.g. the rotation stability of the rotation shaft, a reduction of the rotation stability due to abrasion of the rotation shaft and so on), the blocking structure cannot be disposed unlimitedly close to the rotation shaft. That is, there must be a certain airflow between the blocking structure and the rotation shaft. Furthermore, there are no other mechanisms of reducing the deposition of dust in the above configuration to the airflow having entered between the blocking structure and the rotation shaft. Therefore, the efficiency of reducing the deposition of dust by the configuration is limited.

SUMMARY OF THE INVENTION

An objective of the invention is to provide a projector with a color wheel module that can increase flowing resistance by narrowing a fluid passage so that an airflow in the fluid passage is deflected from a direction toward the optical sensor for further reducing the amount of dust deposited on the optical sensor.

A projector according to invention includes a color wheel module for producing a color light, and an optical engine for receiving the color light. The color wheel module includes a rotation device, a mount, a color wheel, and an optical sensor. The rotation device is fixed on the mount and includes a rotary part. The rotary part has a rotary surface rotating in a rotation direction. The mount includes an anti-dust structure having a curved surface. The curved surface is opposite to the rotary surface and extends in the rotation direction. The curved surface has a first section and a second section sequentially in the rotation direction. The first section and the rotary surface form a first distance therebetween; the second section and the rotary surface forma second distance therebetween. The first distance is larger than the second distance. The color wheel is fixed on the rotary part. The optical sensor is fixed on the mount and has a sensing surface toward the rotary surface. The curved surface and the sensing surface are arranged sequentially in the rotation direction. Thereby, the curved surface and the rotary surface form a narrow passage therebetween. An airflow induced by the rotary surface due to the rotation of the rotary part is subjected to a constraint by the narrow passage, so only a small part of the airflow can flow through the narrow passage and reach the sensing surface. Therefore, the amount of dust deposited on the sensing surface is efficiently reduced. Furthermore, the narrow passage provides a larger resistance to the airflow in the narrow passage at the second section than at the first section, so that when flowing at the second section, the airflow tends to flow out from two opposite sides of the narrow passage. In other words, only a part of the airflow entering the narrow passage can flow past the second section and reach the sensing surface, so that the amount of the dust deposited on the sensing surface can be reduced further, which enhances the anti-dust effect of the anti-dust structure and solves the problem in the prior art that the blocking structure can do nothing of reducing the deposition of dust to the airflow having entered between the blocking structure and the rotation shaft.

Another objective of the invention is to provide a projector with a color wheel module that includes a guiding slot beside its curved surface so that an airflow in a fluid passage of the color wheel module tends to flow toward the guiding slot and be deflected from a direction to the optical sensor for further reducing the amount of dust deposited on the optical sensor.

A projector according to invention includes a color wheel module for producing a color light, and an optical engine for receiving the color light. The color wheel module includes a rotation device, a mount, a color wheel, and an optical sensor. The rotation device is fixed on the mount and includes a rotary part. The rotary part has a rotary surface rotating in a rotation direction. The mount includes an anti-dust structure. The anti-dust structure has a curved surface and a guiding slot. The curved surface is opposite to the rotary surface and extends in the rotation direction. The guiding slot is disposed beside the curved surface, is lower than the curved surface, and extends substantially in the rotation direction. The color wheel is fixed on the rotary part. The optical sensor is fixed on the mount and has a sensing surface toward the rotary surface. The curved surface and the sensing surface are arranged sequentially in the rotation direction. Thereby, the rotary surface and the curved surface with the guiding slot form a narrow passage therebetween. An airflow induced by the rotary surface due to the rotation of the rotary part is subjected to a constraint by the narrow passage, so only a small part of the airflow can flow through the narrow passage and reach the sensing surface. Therefore, the amount of dust deposited on the sensing surface is efficiently reduced. Furthermore, the narrow passage provides a lower resistance to the airflow in a portion of the narrow passage, corresponding to the guiding slot, than in a portion of the narrow passage, corresponding to the curved surface, so that the airflow in the narrow passage tends to flow toward the guiding slot. In other words, only a part of the airflow entering the narrow passage can flow past the second section in the rotation direction and reach the sensing surface, so that the amount of the dust deposited on the sensing surface can be reduced further, which enhances the anti-dust effect of the anti-dust structure and solves the problem in the prior art that the blocking structure can do nothing of reducing the deposition of dust to the airflow having entered between the blocking structure and the rotation shaft.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
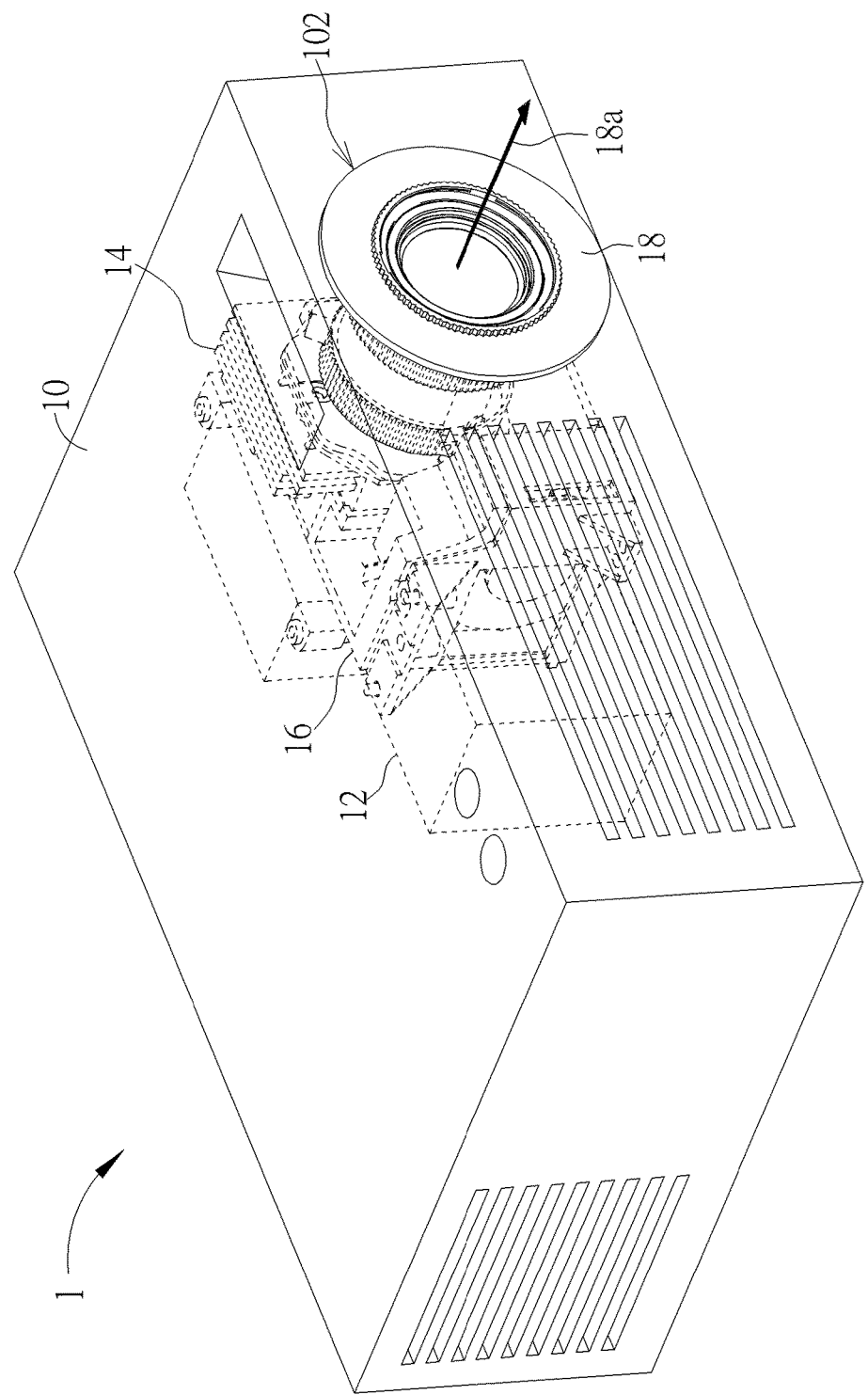
FIG. 1 is a schematic diagram illustrating a projector of an embodiment according to the invention.

Please refer to FIG. 1, which is a schematic diagram illustrating a projector 1 of an embodiment according to the invention. The projector 1 includes an apparatus casing 10, a light module 12, an optical engine 14, a color wheel module 16, and a projection lens 18. The light module 12, the optical engine 14, the color wheel module 16, and a portion of the projection lens 18 are disposed in the apparatus casing 10. The light module 12, the color wheel module 16, and the projection lens 18 are coupled to the optical engine 14. The projection lens 18 protrudes out of the apparatus casing 10 from an opening 102 of the apparatus casing 10. Therein, the light module 12 and some components of the optical engine 14 are shown by rectangles. The light module 12 provides light that is filtered through the color wheel module 16 to form various color lights that are received and modulated by the optical engine 14 and then projected in a projection direction 18a onto a screen by the projection lens 18 so as to form an image.

Figure 2:
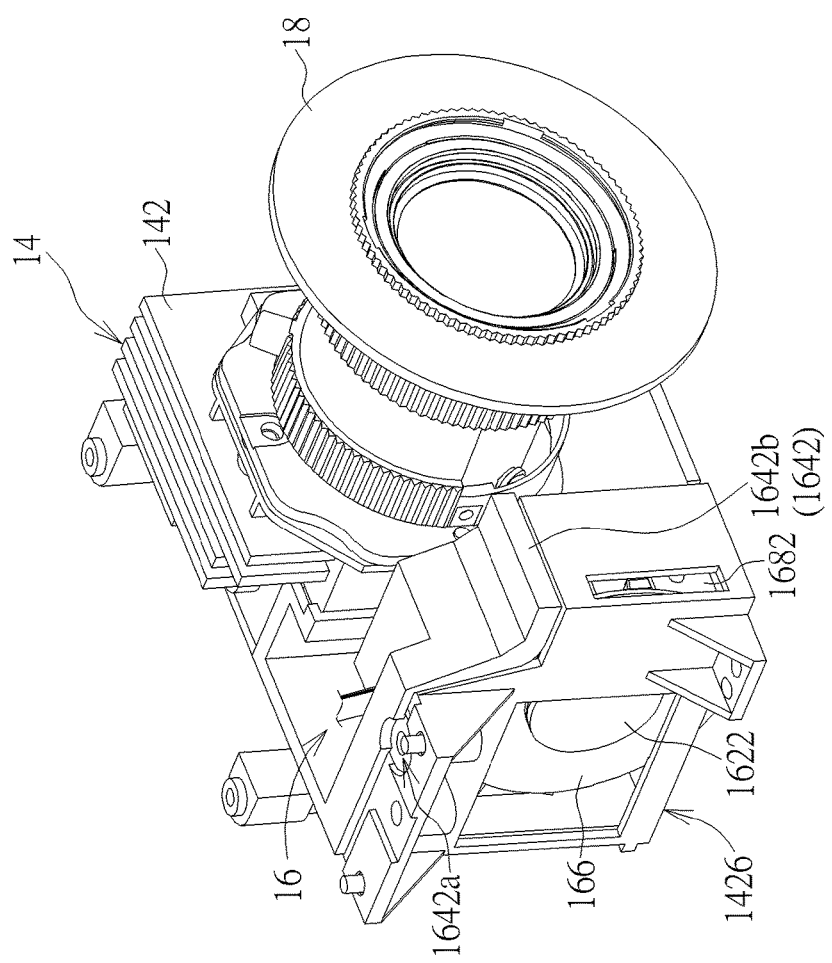
FIG. 2 is an assembly drawing of a color wheel module and a projection lens coupled to an optical engine of the projector in FIG. 1.
Figure 3:
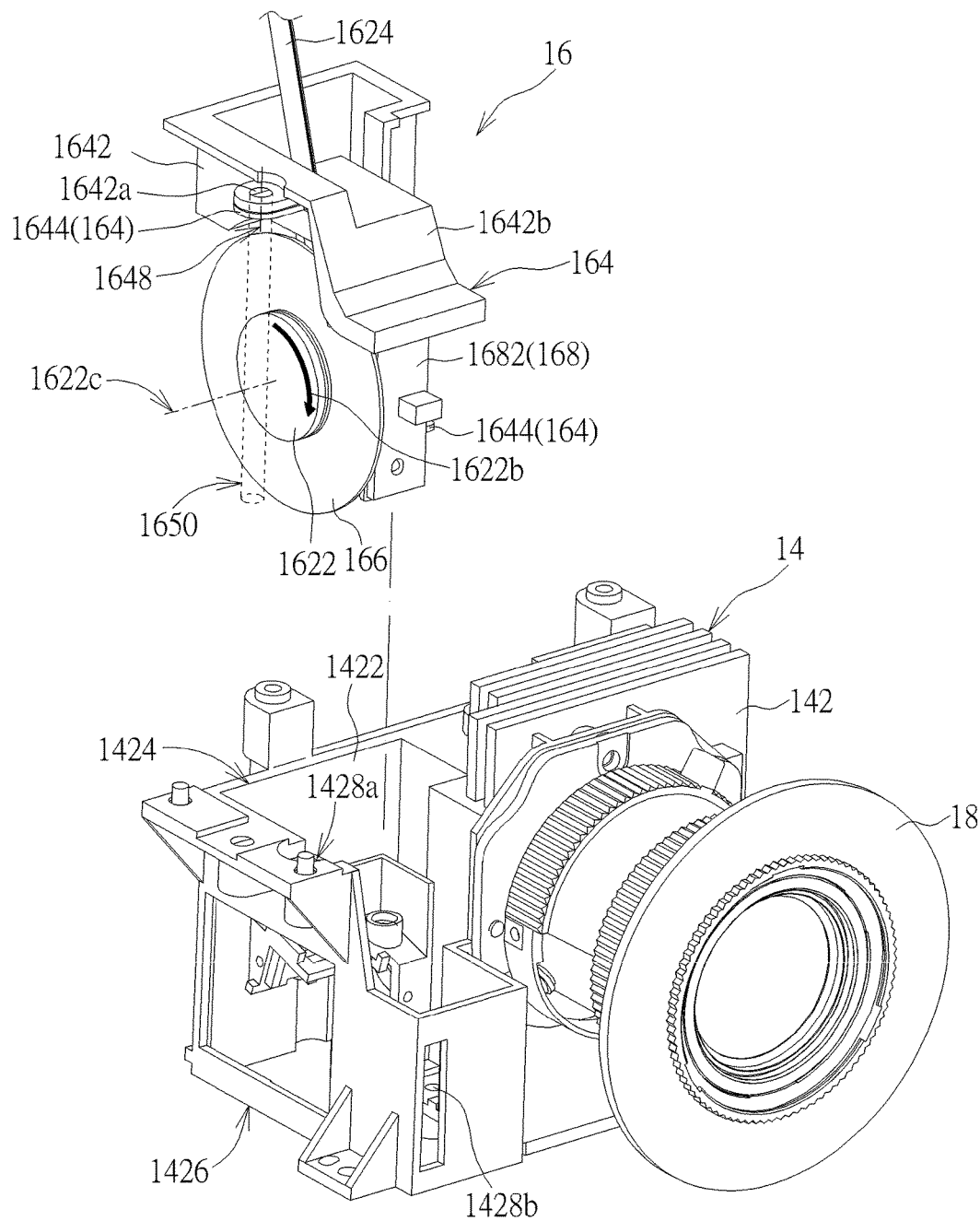
FIG. 3 is an exploded view of the color wheel module and the optical engine in FIG. 2.
Figure 4:
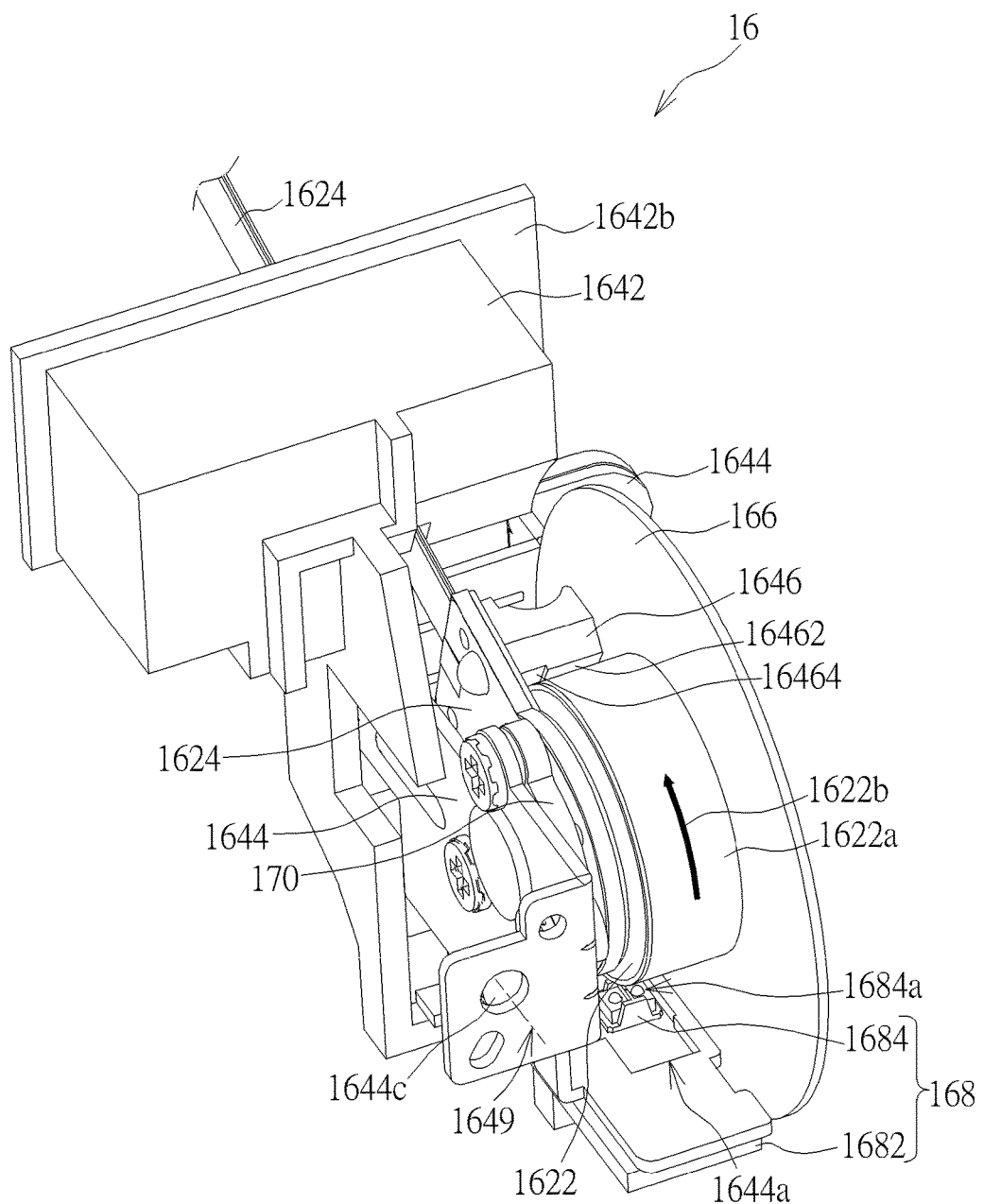
FIG. 4 is a schematic diagram illustrating the color wheel module in FIG. 3 in another viewpoint.
Figure 5:
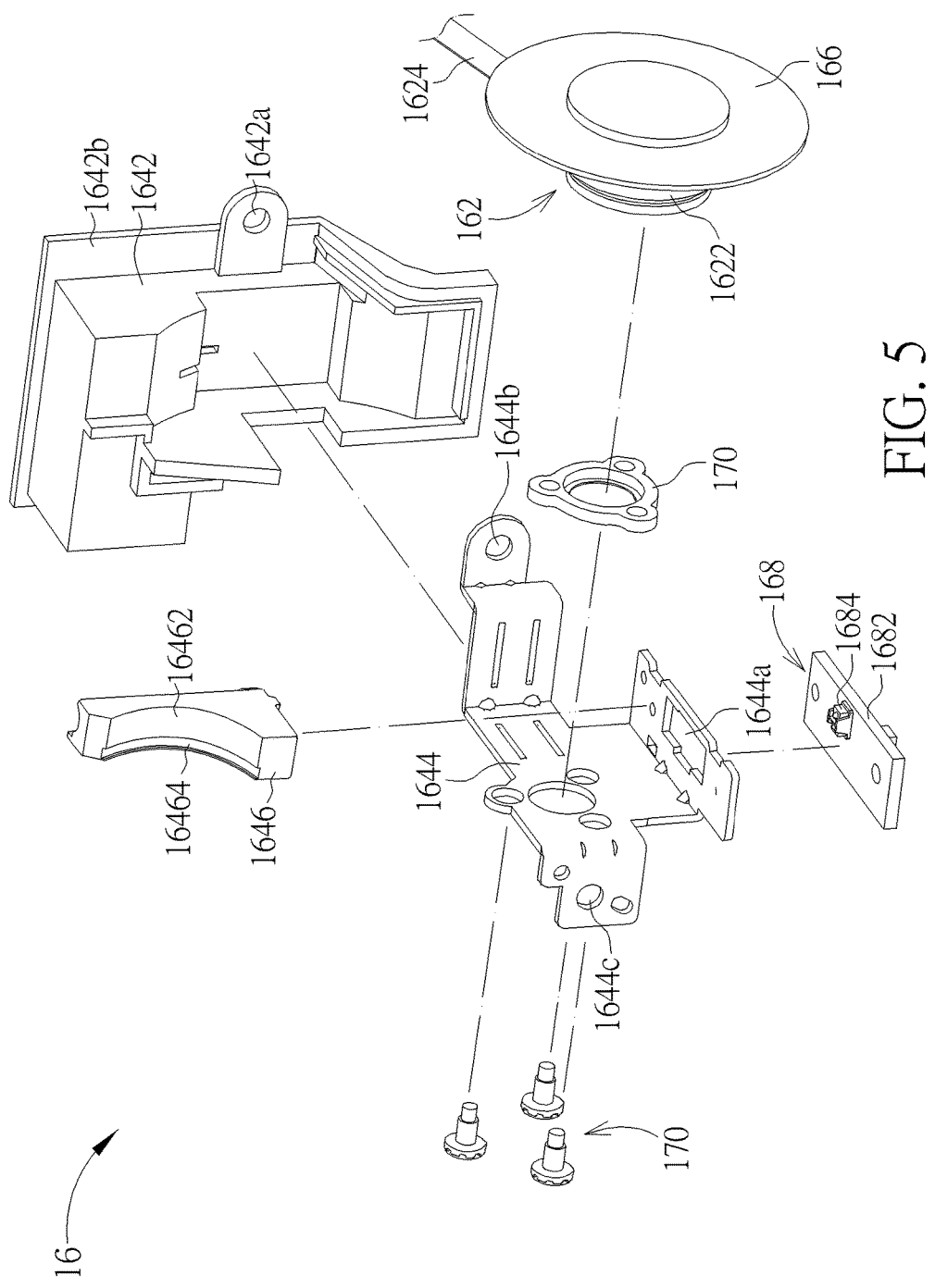
FIG. 5 is an exploded view of the color wheel module in FIG. 4.

Please also refer to FIG. 2 to FIG. 5. FIG. 2 is an assembly drawing of the color wheel module 16 and the projection lens 18 which are coupled to the optical engine 14. FIG. 3 is an exploded view of the color wheel module 16 and the optical engine 14. FIG. 4 is a schematic diagram illustrating the color wheel module 16 in another viewpoint. FIG. 5 is an exploded view of the color wheel module 16. The optical engine 14 includes a housing 142. The housing 142 has an accommodating space 1422, a first opening 1424, and a second opening 1426. The first opening 1424 and the second opening 1426 are opposite to each other and connect with the accommodating space 1422. From the viewpoint of FIG. 3, the color wheel module 16 is disposed in the accommodating space 1422 by inserting the color wheel module 16 from above of the optical engine 14 downward through the first opening 1424 into the accommodating space 1422. The color wheel module 16 includes a rotation device 162, a mount 164, a color wheel 166, and a rotation sensing module 168. The rotation device 162 can be but not limited to a motor and a control circuit therefor. The rotation device 162 includes a rotary part 1622 and a control circuit 1624. The control circuit 1624 is used for controlling the rotation of the rotary part 1622. The rotary part 1622 has a rotary surface 1622a that rotates in a rotation direction 1622b (indicated by an arrow in FIG. 3 and FIG. 5). The mount 164 includes a cover 1642, a fixing part 1644, and an anti-dust structure 1646. The rotation device 162 is fixed through a vibration reducer 170 to the fixing part 1644. The cover 1642 is connected to the fixing part 1644. The anti-dust structure 1646 is disposed on the fixing part 1644 and has a curved surface 16462 and a guiding slot 16464. The curved surface 16462 is opposite to the rotary surface 1622a and extends in the rotation direction 1622b. The guiding slot 16464 is disposed beside the curved surface 16462a and is lower than the curved surface 16462. The guiding slot 16464 extends substantially in the rotation direction 1622b. The curved surface 16462 and the guiding slot 16464 are toward the rotary surface 1622a so that a narrow passage is formed between the rotary surface 1622a and the curved surface 16462 with the guiding slot 16464. In the embodiment, in principle, the portion of the anti-dust structure 1646 that faces the rotary surface 1622a can be taken as the curved surface 16462, on which the guiding slot 16464 is formed. The color wheel 166 is fixed on the rotary part 1622, so that the color wheel 166 rotates together with the rotary part 1622.

Figure 6:
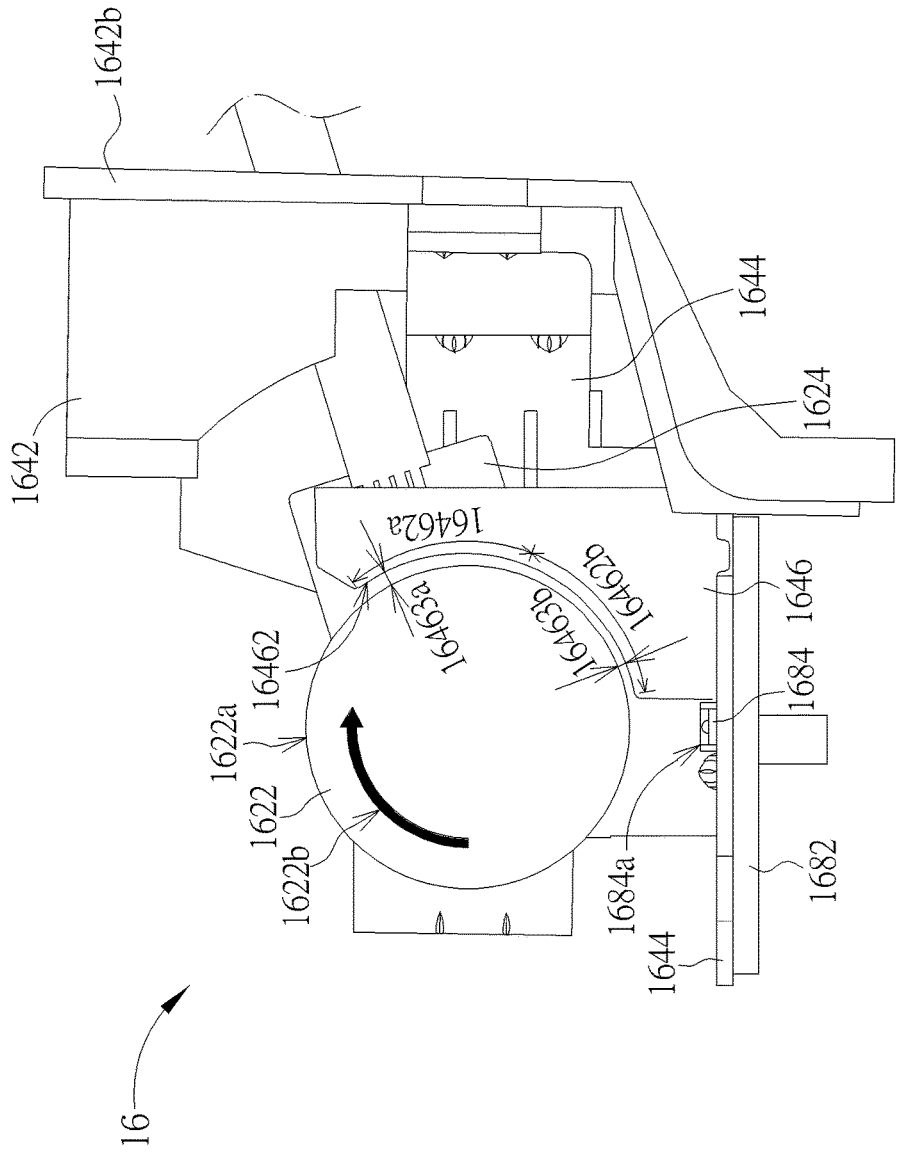
FIG. 6 is a front view of the color wheel module in FIG. 4.

The rotation sensing module 168 includes a control circuit 1682 and an optical sensor 1684 fixed on the control circuit 1682. The optical sensor 1684 has a sensing surface 1684a. The rotation sensing module 168 is fixed on the fixing part 1644, so that the sensing surface 1684a is toward the rotary surface 1622a and therefore can sense the rotation of the rotary surface 1622a. In the embodiment, the fixing part 1644 has a through hole 1644a. The control circuit 1682 (e.g. but not limited to a circuit board module) is fixed on the fixing part 1644 from the bottom thereof in the viewpoint of FIG. 4, so that the optical sensor 1684 is fixed on the fixing part 1644 through the control circuit 1682 and accommodated in the through hole 1644a. The sensing surface 1684a is exposed through the through hole 1644a and faces the rotary surface 1622a, so that the optical sensor 1684 senses the rotation of the rotary surface 1622a (or the rotary part 1622) through the sensing surface 1684a. Please also refer to FIG. 6. FIG. 6 is a front view of the color wheel module 16; therein, the fixing part 1644 is shown with being partially cut. The curved surface 16462 and the sensing surface 1684a are arrange sequentially in the rotation direction 1622b (indicated by an arrow in FIG. 6). From the viewpoint of FIG. 6, the space between the anti-dust structure 1646 and the rotary surface 1622a is the narrow passage mentioned above. An airflow induced due to the rotation of the rotary surface 1622a is subjected to a constraint by the narrow passage, and a little of the airflow can flow through the narrow passage and reach the sensing surface 1684a. Therefore, the amount of dust deposited on the sensing surface 1684a is efficiently reduced. It is added that in the embodiment, the sensing surface 1684*a* is lower than an extension line (as shown by a dash line in FIG. 7) of the curved surface 16462, which keeps the airflow that passes through the narrow passage from directly hitting the sensing surface 1684*a* and reduces the amount of the dust deposited on the sensing surface 1684*a*.

Figure 7:
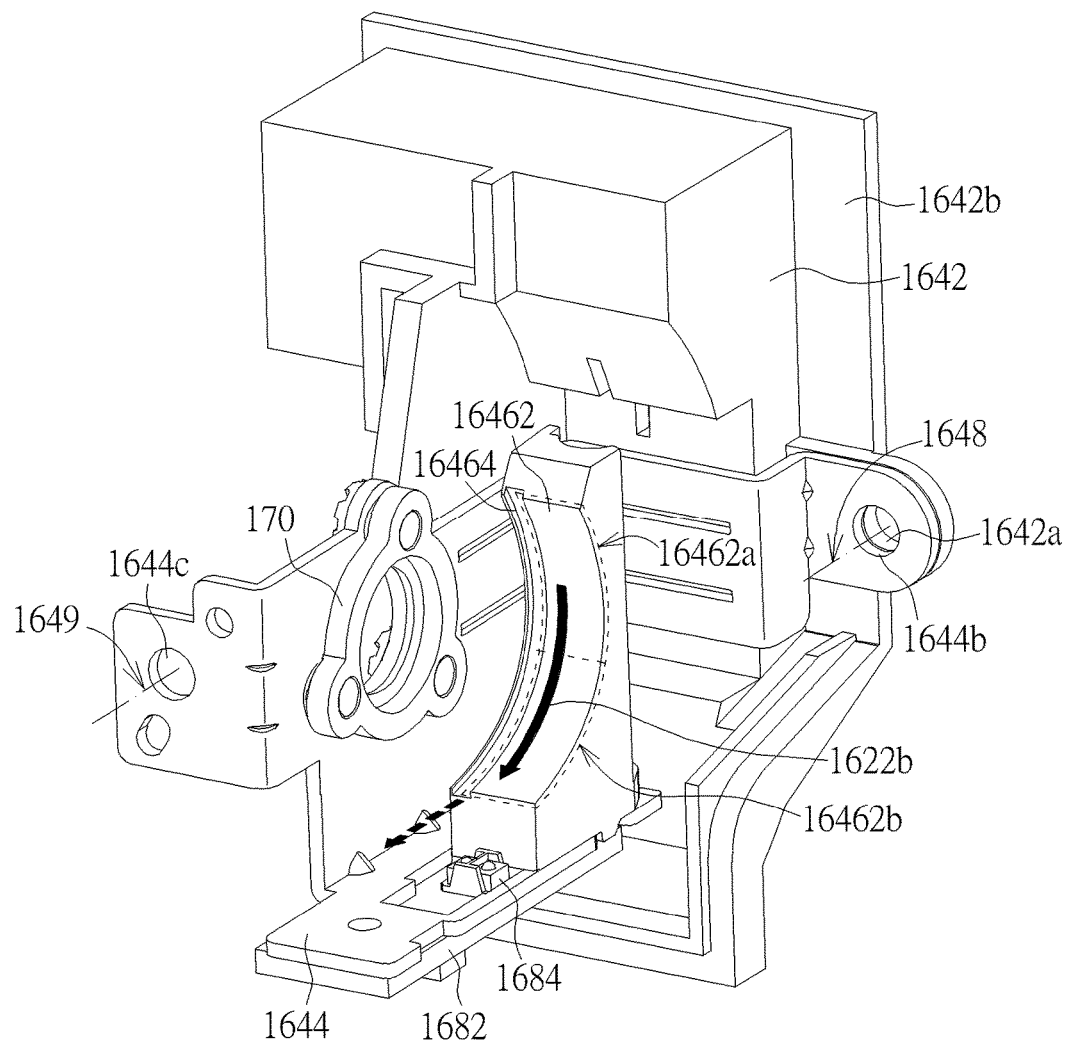
FIG. 7 is a schematic diagram illustrating the color wheel module in FIG. 4 without a rotation device in another viewpoint.

Please also refer to FIG. 7. FIG. 7 is a schematic diagram illustrating the color wheel module 16 in another viewpoint. In FIG. 7, the rotation device 162 and the color wheel 166 are omitted, and a distance between the guiding slot 16464 and the rotary surface 1622*a* is larger than that between the curved surface 16462 and the rotary surface 1622*a*. A flowing resistance to the airflow flowing between the guiding slot 16464 and the rotary surface 1622*a* is relatively small, so that after entering the narrow passage formed by the rotary surface 1622*a* and the curved surface 16462 with the guiding slot 16464, the airflow tends to flow between the guiding slot 16464 and the rotary surface 1622*a*. Furthermore, an extension line (as shown by a bold dashed line with an arrow in FIG. 7) of the guiding slot 16464 does not pass through the sensing surface 1684*a* of the optical sensor 1684. Therefore, in principle, the airflow flowing substantially in the rotation direction 1622*b* (indicated by a bold arrow in FIG. 7) between the guiding slot 16464 and the rotary surface 1622*a* will not impact on the sensing surface 1684*a* after departing from the narrow passage; the dust contained in this airflow will not be deposited on the sensing surface 1684*a*. In other words, because of the guiding effect of the guiding slot 16464 on the airflow having entered the narrow passage (formed between the rotary surface 1622*a* and the curved surface 16462 with the guiding slot 16464), a little of the airflow will flow past the sensing surface 1684*a*, and the amount of the dust deposited on the sensing surface 1684*a* can be reduced further. The configuration of the guiding slot 16464 solves the problem in the prior art that the blocking structure does nothing of reducing the deposition of dust to the airflow having entered between the blocking structure and the rotation shaft.

In the embodiment, the curved surface 16462 has a first section 16462*a* and a second section 16462*b* (of which the areas are indicated by dashed rectangles in FIG. 7) sequentially in the rotation direction 1622*b*. The first section 16462*a* and the rotary surface 1622*a* form a first distance 16463*a* therebetween. The second section 16462*b* and the rotary surface 1622*a* form a second distance 16463*b* therebetween. The first distance 16463*a* is larger than the second distance 16463*b*. In practice, the curved surface 16462 is disposed substantially parallel to the rotary surface 1622*a*. The distance between the curved surface 16462 and the rotary surface 1622*a* varies gradually so as to reduce turbulence of the airflow. For this case, an average of the distance between the first section 16462*a* and the rotary surface 1622*a* can be taken as the above first distance 16463*a*; an average of the distance between the second section 16462*b* and the rotary surface 1622*a* can be taken as the above second distance 16463*b*. However, the invention is not limited thereto. As far as the curved surface 16462 is concerned, the first distance 16463*a* is larger than the second distance 16463*b*, so the airflow that flows between the curved surface 16462 and the rotary surface 1622*a* will be subjected to a higher flowing resistance at the second section 16462*b* than at the first section 16462*a*. The airflow largely tends to flow out from two opposite sides of the second section 16462*b* when flowing at the second section 16462*b*. In other words, a little of the airflow can pass through the narrow passage (formed between the curved surface 16462 and the rotary surface 1622*a*), the second section 16462*b* in the rotation direction 1622*b*, and reach the sensing surface 1684*a*. Because the distance between the curved surface 16462 and the rotary surface 1622*a* becomes narrow gradually, a little of the airflow having entered the narrow passage will flow above the sensing surface 1684*a*, and the amount of the dust deposited on the sensing surface can be reduced further. Therefore, shortening the distance between the curved surface 16462 and the rotary surface 1622*a* also solves the problem in the prior art that the blocking structure does nothing of reducing the deposition of dust to the airflow having entered between the blocking structure and the rotation shaft.

Figure 8:
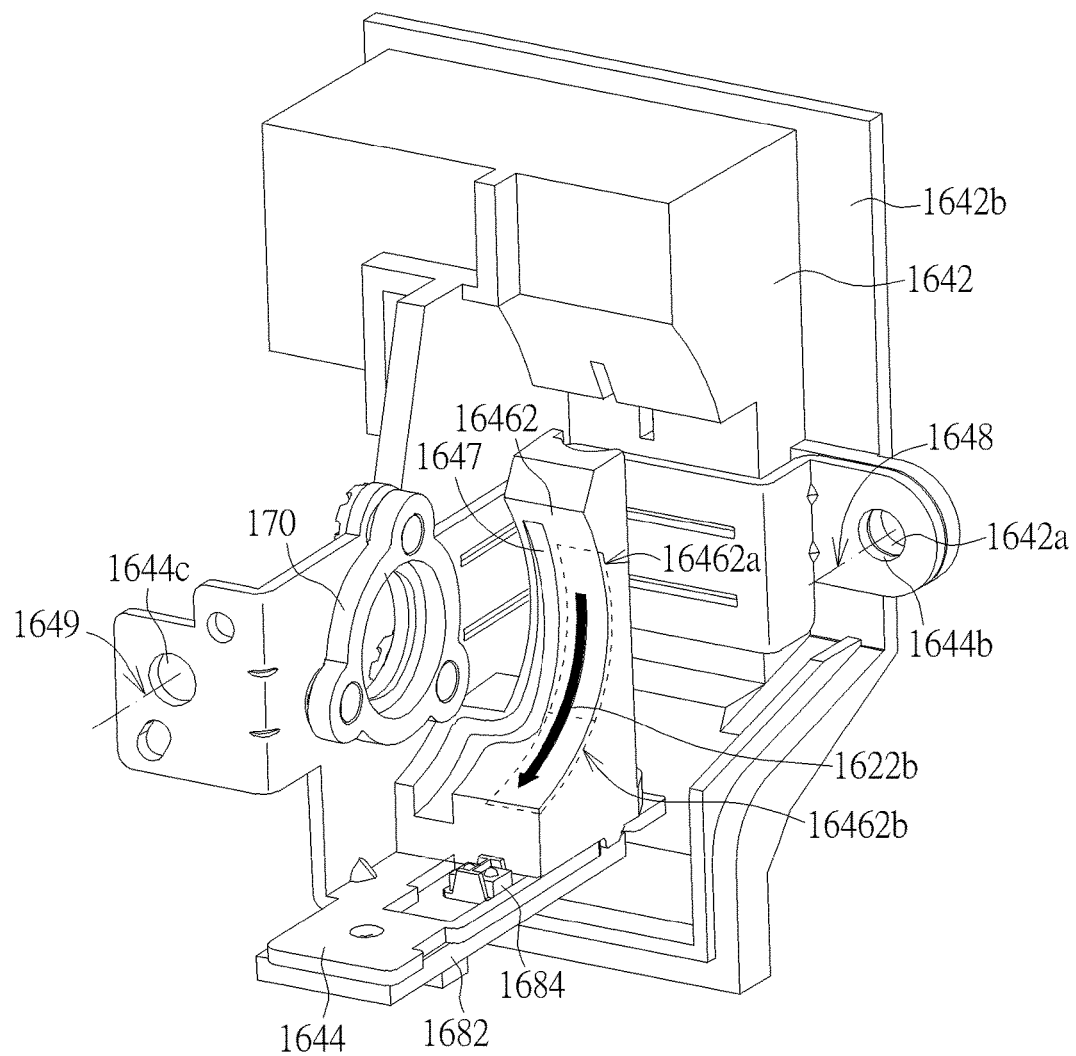
FIG. 8 is a schematic diagram illustrating a color wheel module without a rotation device according to an embodiment.

In the embodiment, the anti-dust structure 1646 provides a dual effect on reducing the deposition of dust on the sensing surface 1684*a* by the guiding slot 16464 and by gradually shortening the distance between the curved surface 16462 and the rotary surface 1622*a*; however, the invention is not limited thereto. In practice, it is practicable to choose either one of the aforementioned features on the anti-dust structure. Furthermore, in practice, the longer the narrow passage formed between the rotary surface 1622*a* and the curved surface 16462 with the guiding slot 16464 in the rotation direction 1622*b*, the better the guiding effect on the airflow having entered the narrow passage (i.e. avoiding the airflow impacting the sensing surface 1684*a*). In the embodiment, the curved surface 16462 extends in the rotation direction 1622*b* by at least 45 degrees; that is, the curved surface 16462 covers the rotary surface 1622*a* in the rotation direction 1622*b* by at least 45 degrees. However, the invention is not limited thereto. In addition, in the embodiment, the guiding slot 16464 is wholly adjacent to and connects with the curved surface 16462, but the invention is not limited thereto. As shown by FIG. FIG. 8, in another embodiment, the guiding slot 16474 of the anti-dust structure 1647 is partially adjacent to the curved surface 16462 and therefore connects with the first section 16462*a* only. The other portion of the guiding slot 16474 extends in a direction diverging from the rotation direction 1622*b* and even from the rotary surface 1622*a*; that is, the other portion of the guiding slot 16474 does not face the rotary surface 1622*a*. This structural configuration leads the airflow, which departs from the anti-dust structure 1647 through the guiding slot 16474, to move far away from the sensing surface 1684*a*; that is further reducing the influence of the airflow on the sensing surface 1684*a* (e.g. the deposition of the dust, contained in the airflow, on the sensing surface 1684*a*).

Figure 9:
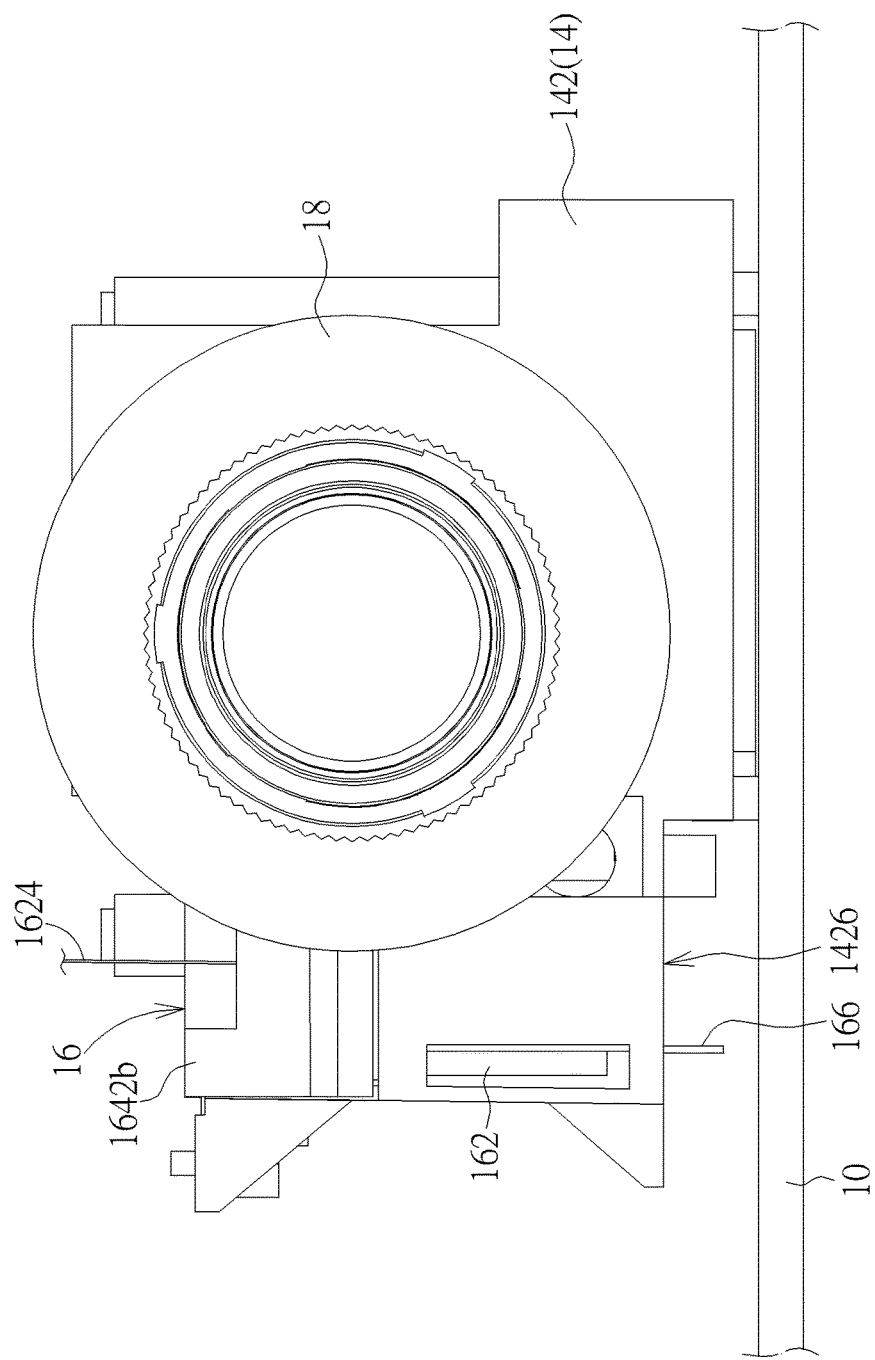
FIG. 9 is a side view of the assembly of the optical engine, the color wheel module, and an apparatus casing in FIG. 1.
Figure 10:
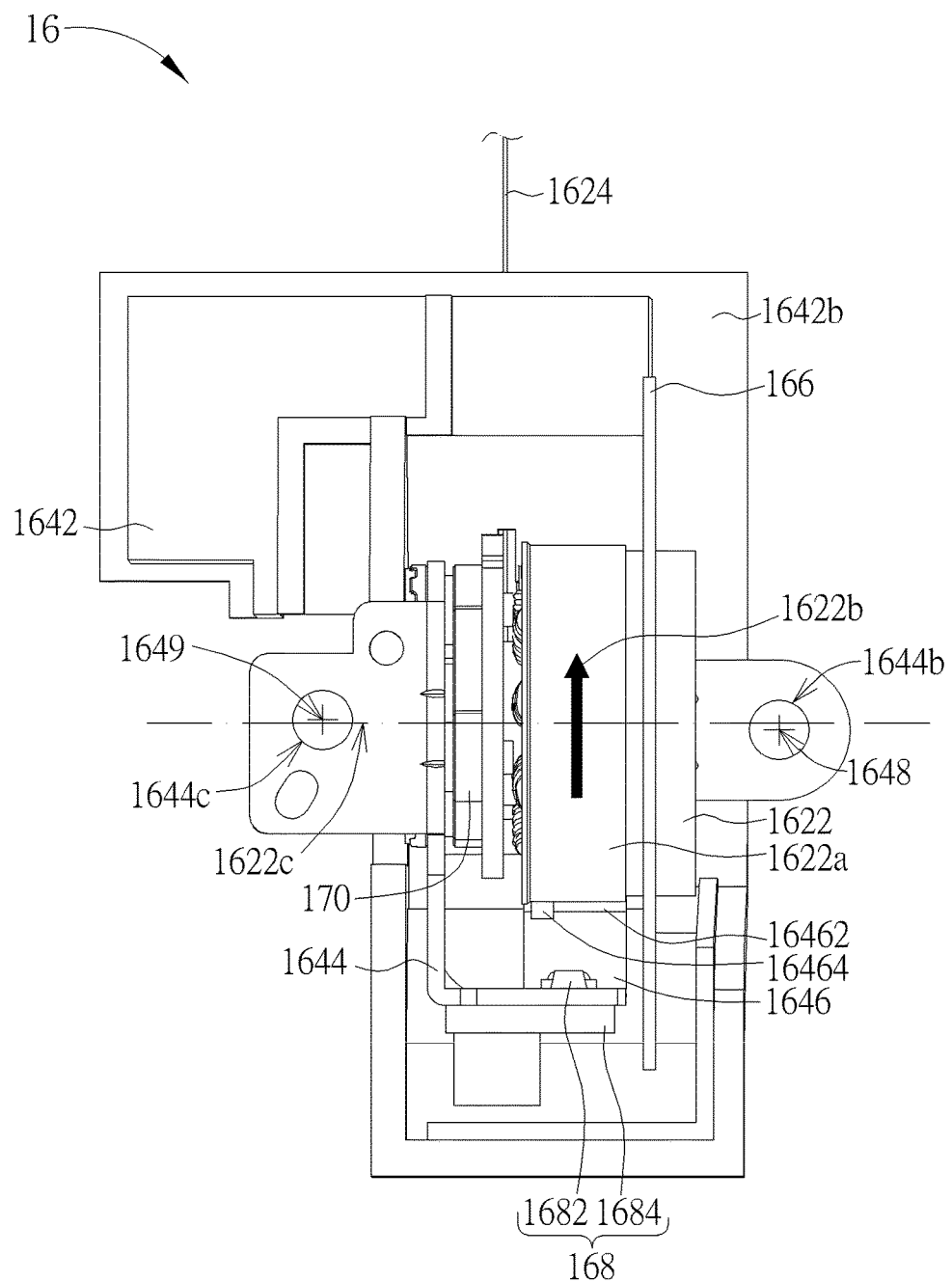
FIG. 10 is a side view of the color wheel module in FIG. 9.

Please also refer to FIG. 9 and FIG. 10. FIG. 9 is a side view of the assembly of the optical engine 14, the color wheel module 16, and the apparatus casing 10. FIG. 10 is a side view of the color wheel module 16. In the embodiment, the fixing part 1644 has two locking holes 1644*b* and 1644*c*. The cover 1642 has a locking hole 1642*a* disposed on the same axis as the locking hole 1644*b*; in the embodiment, the locking holes 1644*b* and 1642*a* are substantially concyclic. The housing 142 of the optical engine 14 has two locking holes 1428*a* and 1428*b* correspondingly. The color wheel module 16 is fixed to the optical engine 14 by the locking holes 1644*b*, 1644*c*, 1642*a*, 1428*a* and 1428*b*, e.g. with screws. Therein, the locking holes 1644*b* and 1642*a* are aligned with the locking hole 1428*a* of the housing 142 at the first opening 1424; the locking hole 1644*c* is aligned with the locking hole 1428*b* in the accommodating space 1422. In addition, the second opening 1426 is toward a bottom wall of the apparatus casing 10 and separately disposed from the bottom wall; that is, a gap exists therebetween, which is conducive to heat dissipation of the color wheel module 16. In the embodiment, the locking holes 1644*b* and 1642*a* have the same center line 1648 (indicated by a center line in FIG. 3 and FIG. 7 and by a cross mark in FIG. 10). A projection space 1650 (indicated by a column in dashed lines in FIG. 3 and shown as the area formed by the profile of the locking holes 1644*b* and 1642*a* in FIG. 10) is defined by the locking hole 1644*b* or 1642*a* extending along the center line 1648. The rotary part 1622 has a rotation axis 1622*c* passing through the projection space 1650. In other words, a projection of the rotation axis 1622*c* on the mount 164 in a direction parallel to the center line 1648 passes through the locking holes 1644*b* and 1642*a*. Thereby, a torque to the housing 142 (especially the portion of the housing 142 where the fixing part 1644 is connected by the locking holes 1644*b* and 1642*a*), that is produced due to the rotation of the rotary part 1622, is reduced so as to enhance the stability of the rotation of the rotary part 1622 relative to the optical engine 14. Furthermore, in the embodiment, the rotation axis 1622*c* also passes through a projection space (shown as the area by the profile of the locking hole 1644*c* in FIG. 10) formed by the locking hole 1644*c* extending along the center line 1649 (indicated by a cross mark in FIG. 10). Similarly, a torque to the housing 142, which is produced due to the rotation of the rotary part 1622, is reduced so as to enhance the stability of the rotation of the rotary part 1622 relative to the optical engine 14. Furthermore, the locking holes 1644*b*, 1644*c* and 1642*a* and the rotation axis 1622 care disposed to be substantially coplanar (i.e. the center lines 1648 and 1649 and the rotation axis 1622*c* are coplanar), and the locking holes 1644*b*, 1644*c* and 1642*a* are located at two opposite sides of the rotary part 1622, so that the color wheel module 16 is firmly fixed by the optical engine 14 and the rotary part 1622 can stably rotate.

In addition, the mount 164 has a side wall portion 1642*b* formed by the cover 1642. After the color wheel module 16 is fixed on the housing 142, the side wall portion 1642*b* substantially seals the first opening 1424 of the housing 142. It is added that in the embodiment, a gap allowing a fixing tool (e.g. a screwdriver) to pass through is formed between the side wall portion 1642*b* and the first opening 1424 and facilitates the fixing of the fixing part 1644 on the housing 142 by the locking hole 1644*c*. In practice, if it is unnecessary for the color wheel module 16 to be fixed by the locking hole 1644*c* or by a fixing operation through the first opening 1424, the side wall portion 1642*b* can be designed to seal the first opening 1424 completely for further improving the sealing of the accommodating space.

Figure 11:
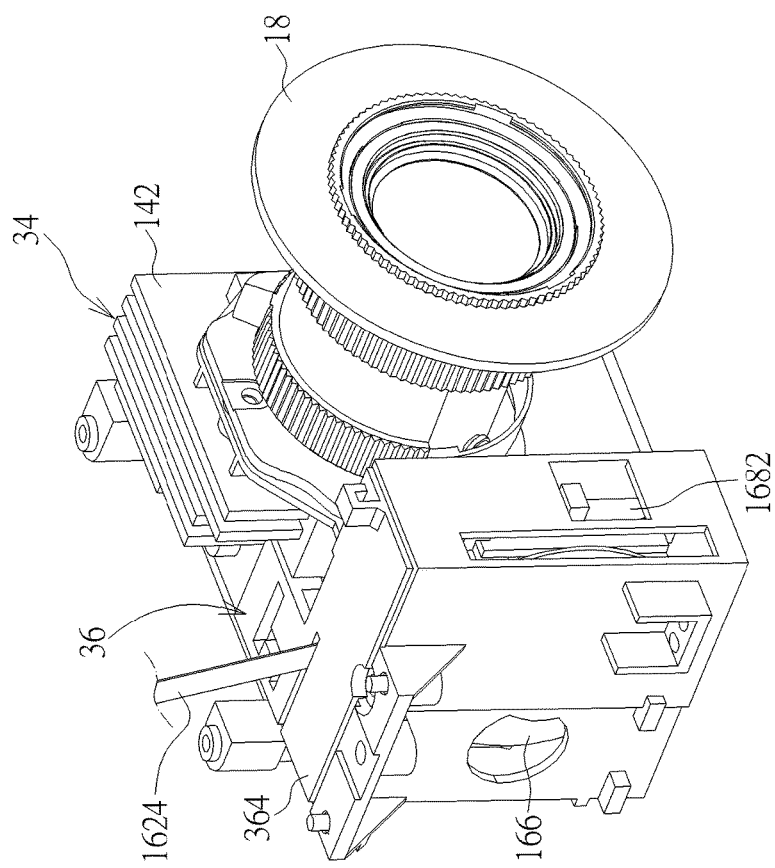
FIG. 11 is an assembly drawing of an optical engine, a color wheel module coupled to the optical engine, and the projection lens of another embodiment according to the invention.
Figure 12:
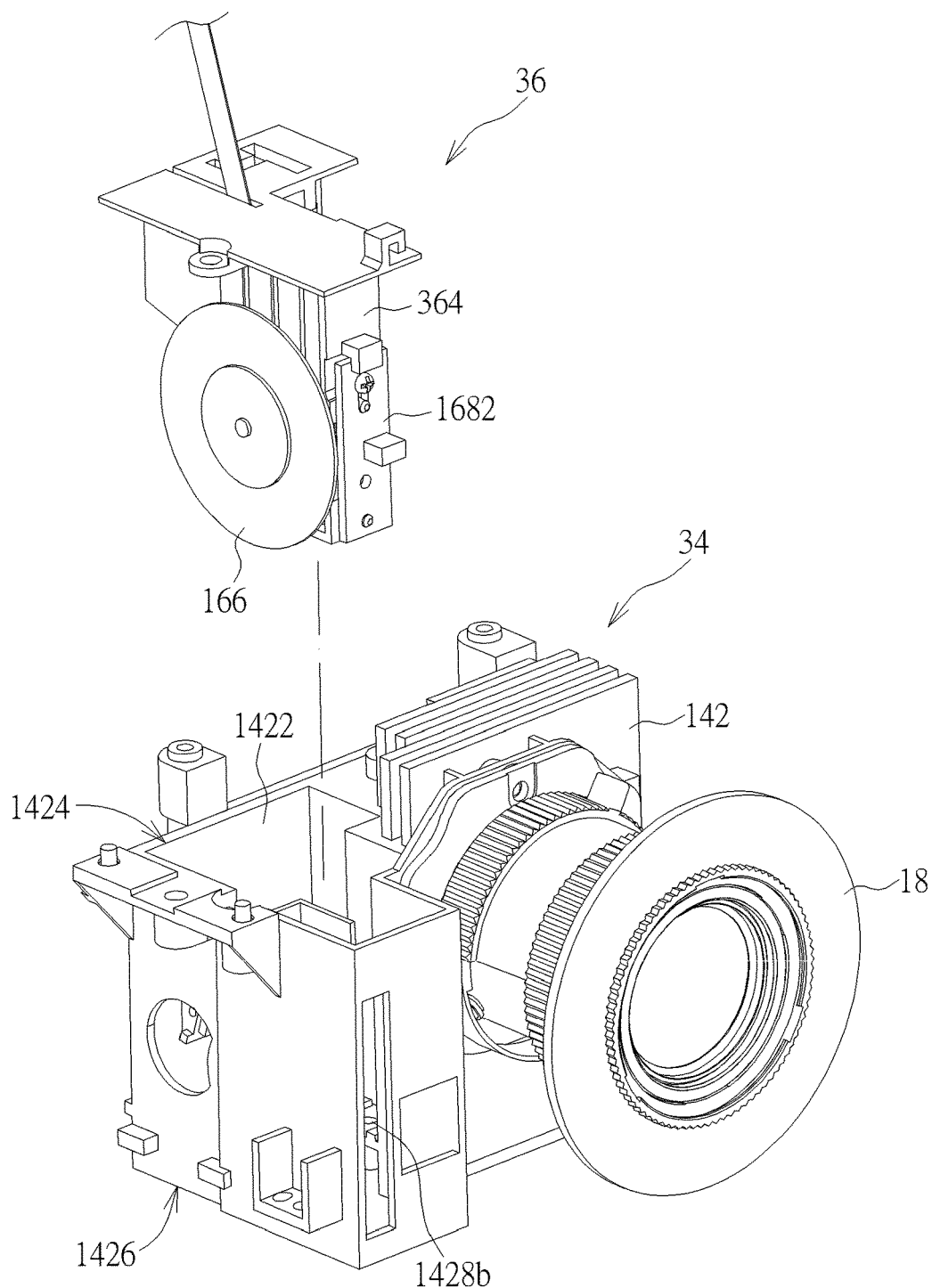
FIG. 12 is an exploded view of the color wheel module and the optical engine in FIG. 11.
Figure 13:
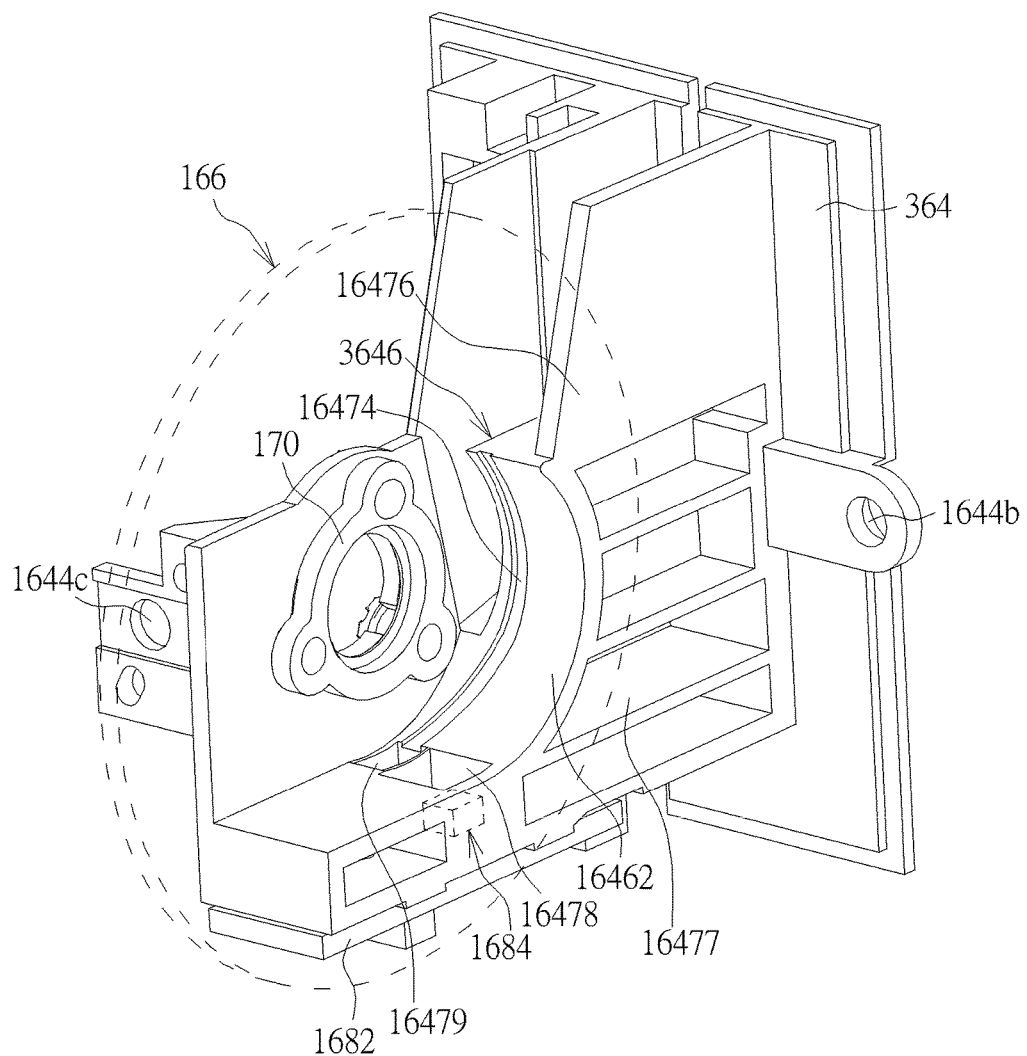
FIG. 13 is a schematic diagram illustrating amount of the color wheel module in FIG. 13.

In the above embodiment, the mount 164 is formed by a combination of parts, but the invention is not limited thereto. Please refer to FIG. 11 to FIG. 13. FIG. 11 is an assembly drawing of an optical engine 34, a color wheel module 36 coupled to the optical engine 34, and the projection lens 18 of another embodiment according to the invention. FIG. 12 is an exploded view of the color wheel module and the optical engine 34. FIG. 13 is a schematic diagram illustrating a mount 364 of the color wheel module 36. The optical engine 34 and the color wheel module 36 are structurally similar to the optical engine 14 and the color wheel module 16 in the above-mentioned embodiment respectively. Therefore, in principle, the optical engine 34 and the color wheel module 36 use the component notations of the optical engine 14 and the color wheel module 16. For other descriptions of the optical engine 34 and the color wheel module 36, please refer to the relevant descriptions of optical engine 14 and the color wheel module 16 mentioned above; they will not be repeated. Furthermore, during interpretation of the following descriptions, please also refer to the relevant descriptions in the foregoing and the figures therefor, and they will not be repeated. In the embodiment, the mount 364 of the color wheel module 36 is integrally formed in one piece, for example but not limited to a plastic injection part. Thereby, the mount 364 as a whole can provide better precision, which can easily and precisely control the relative position of the curved surface 16462 of the anti-dust structure 3646 of the mount 364 and the rotary surface 1622*a*.

In the embodiment, the anti-dust structure 3646 of the mount 364 has a side surface 16476 and an accommodating recess 16477. The side surface 16476 is opposite to the color wheel 166 (shown by its profile in dashed lines in FIG. 13). The accommodating recess 16477 is formed on the side surface 16476. The color wheel 166 covers at least a portion of the accommodating recess 16477. Thereby, dust contained in an airflow induced between the color wheel 166 and the side surface 16476 due to the rotation of the color wheel 166 can be deposited in the accommodating recess 16477, which is conducive to a reduction in the amount of the dust contained in the air inside the accommodating space 1422. It is added that the anti-dust structure 1646 of the color wheel module 16 can be provided with a structure like the accommodating recess 16477 and performs the same effect, which will not be repeated.

In addition, because the mount 364 is integrally formed in one piece, the control circuit 1682 of the rotation sensing module 168 is fixed on the mount 364 from the bottom thereof (in the viewpoint of FIG. 13), and the mount 364 has a through hole 16478 corresponding to the control circuit 1682 beside the curved surface 16462, so the optical sensor 1684 can be exposed through the through hole 16478 for sensing the rotation of the rotary surface 1622*a*. In the embodiment, the optical sensor 1684 (indicated by dashed lines in FIG. 13) is located in the through hole 16478. The sensing surface 1684*a* of the optical sensor 1684 is lower than the opening edge of the through hole 16478 and an extension of the curved surface 16462, which keeps the airflow passing through the narrow passage from directly hitting the sensing surface 1684*a* and also reduces the amount of the dust deposited on the sensing surface 1684*a*. Furthermore, the mount 364 has an accommodating recess 16479 adjacent to the through hole 16478 at one end of the guiding slot 16474. The airflow, passing through the narrow passage formed between the anti-dust structure 3646 and the rotary surface 1622*a*, flows out the narrow passage from the guiding slot 16474, so that the dust contained in the portion of the airflow can be deposited in the accommodating recess 16479 and will not be spread in the accommodating space 1422 by the portion of the airflow, which indirectly reduces the amount of the dust in the airflow induced by the rotary surface 1622*a* of the rotary part 1622.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A projector, comprising:
a color wheel module for producing a color light, the color wheel module comprising:
 a rotation device comprising a rotary part having a rotary surface rotating in a rotation direction;
 a mount comprising an anti-dust structure having a curved surface, the rotation device being fixed on the mount, the curved surface being a continuous surface, the curved surface being opposite to the rotary surface and extending in the rotation direction, the curved surface having a first section and a second section in order in the rotation direction, the first section and the rotary surface forming a first distance therebetween in a direction perpendicular to a rotation axis of the rotary part, the second section and the rotary surface forming a second distance therebetween in a direction perpendicular to the rotation axis of the rotary part, the first distance being larger than the second distance;

a color wheel fixed on the rotary part; and an optical sensor fixed on the mount and having a sensing surface toward the rotary surface, the curved surface and the sensing surface being arranged in order in the rotation direction; and an optical engine for receiving the color light.

2. The projector of claim 1, wherein the anti-dust structure comprises a guiding slot that is disposed beside the curved surface, is lower than the curved surface, and extends substantially in the rotation direction.

3. The projector of claim 2, wherein a portion of the guiding slot is connected to the first section.

4. The projector of claim 1, wherein the mount has a locking hole, the color wheel module is fixed to a housing of the optical engine by the locking hole, the locking hole has a center line, a projection space is defined by the locking hole extending along the center line, and the rotation axis passes through the projection space.

5. The projector of claim 1, wherein the curved surface extends in the rotation direction by at least 45 degrees.

6. The projector of claim 1, wherein the anti-dust structure has a side surface and an accommodating recess formed on the side surface, the side surface is opposite to the color wheel, and the color wheel covers at least a portion of the accommodating recess.

7. The projector of claim 1, wherein the optical engine comprises a housing, the housing has an accommodating space and a first opening connecting with the accommodating space, and the color wheel module is disposed in the accommodating space.

8. The projector of claim 7, wherein the mount has a side wall portion sealing the first opening.

9. The projector of claim 7, further comprising an apparatus casing, wherein the optical engine and the color wheel module are disposed in the apparatus casing, the housing has a second opening opposite to the first opening and connecting with the accommodating space, the second opening is toward a wall of the apparatus casing and separately disposed from the wall, the mount has two locking holes, the rotation axis and the two locking holes are disposed to be substantially coplanar, and the color wheel module is fixed to the housing and the apparatus casing by the two locking holes at the first opening and the second opening respectively.

10. A projector, comprising:

a color wheel module for producing a color light, the color wheel module comprising:

a rotation device comprising a rotary part having a rotary surface rotating in a rotation direction;

a mount comprising an anti-dust structure, the rotation device being fixed on the mount, the anti-dust structure having a curved surface and a guiding slot, the curved surface being a continuous surface, the curved surface being opposite to the rotary surface and extending in the rotation direction, the curved surface having a first section and a second section sequentially in the rotation direction, the first section and the rotary surface forming a first distance therebetween, the second section and the rotary surface forming a second distance therebetween, the first distance being larger than the second distance, the guiding slot being disposed beside the curved surface, being lower than the curved surface, and extending substantially in the rotation direction, the curved surface and the rotary surface forming a passage therebetween, the passage extending in the rotation direction;

a color wheel fixed on the rotary part; and an optical sensor fixed on the mount and having a sensing surface toward the rotary surface, the curved surface and the sensing surface being arranged in order in the rotation direction, wherein when the rotation part rotates, an airflow induced by the rotary surface passes through the passage before the airflow reaches the optical sensor; and an optical engine for receiving the color light.

11. The projector of claim 10, wherein a portion of the guiding slot is connected to the first section.

12. The projector of claim 10, wherein the mount has a locking hole, the color wheel module is fixed to a housing of the optical engine by the locking hole, the locking hole has a center line, a projection space is defined by the locking hole extending along the center line, the rotary part has a rotation axis, and the rotation axis passes through the projection space.

13. The projector of claim 10, wherein the curved surface extends in the rotation direction by at least 45 degrees.

14. The projector of claim 10, wherein the anti-dust structure has a side surface and an accommodating recess formed on the side surface, the side surface is opposite to the color wheel, and the color wheel covers at least a portion of the accommodating recess.

15. The projector of claim 10, wherein the optical engine comprises a housing, the housing has an accommodating space and a first opening connecting with the accommodating space, and the color wheel module is disposed in the accommodating space.

16. The projector of claim 15, wherein the mount has a side wall portion sealing the first opening.

17. The projector of claim 15, wherein further comprising an apparatus casing, wherein the optical engine and the color wheel module are disposed in the apparatus casing, the housing has a second opening opposite to the first opening and connecting with the accommodating space, the second opening is toward a wall of the apparatus casing and separately disposed from the wall, the mount has two locking holes, the rotary part has a rotation axis, the rotation axis and the two locking holes are disposed to be substantially coplanar, and the color wheel module is fixed to the housing and the apparatus casing by the two locking holes at the first opening and the second opening respectively.

* * * * *